(12) United States Patent
De Dominicis et al.

(10) Patent No.: US 7,229,503 B2
(45) Date of Patent: Jun. 12, 2007

(54) TREATMENT OF GLASS SUBSTRATA WITH (PER) FLUOROPOLYETHER COMPOUNDS

(75) Inventors: Mattia De Dominicis, Padua (IT); Gabriella Carignano, Milan (IT)

(73) Assignee: Solvay Solexis, S.p.A., Milan (IT)

( * ) Notice: Subject to any disclaimer, the term of this patent is extended or adjusted under 35 U.S.C. 154(b) by 0 days.

(21) Appl. No.: 10/062,490

(22) Filed: Feb. 5, 2002

(65) Prior Publication Data

US 2002/0148999 A1 Oct. 17, 2002

(30) Foreign Application Priority Data

Feb. 8, 2001 (IT) ................. MI01A0252

(51) Int. Cl.
*B08B 7/00* (2006.01)
(52) U.S. Cl. .......................... 134/4; 65/60.3
(58) Field of Classification Search ................ 65/60.3; 427/407.2; 428/426; 252/182.11; 106/287.13, 106/287.14, 287.16; 134/4
See application file for complete search history.

(56) References Cited

U.S. PATENT DOCUMENTS

| 3,810,874 A | 5/1974 | Mitsch et al. |
| 3,847,978 A | 11/1974 | Sianesi et al. |
| 4,094,911 A | 6/1978 | Mitsch et al. |
| 4,818,619 A | 4/1989 | Strepparola et al. |
| 5,274,159 A | 12/1993 | Pellerite et al. |
| 5,286,815 A | 2/1994 | Leir et al. |
| 5,644,014 A | 7/1997 | Schmidt et al. |
| 5,714,637 A | 2/1998 | Marchionni et al. |
| 6,033,738 A | 3/2000 | Teranishi et al. |
| 6,511,721 B1 * | 1/2003 | Murata et al. ............ 428/1.3 |
| 2002/0090515 A1 * | 7/2002 | Pellerite et al. ............ 428/406 |

FOREIGN PATENT DOCUMENTS

| EP | 0 374 740 A2 | 6/1990 |
| EP | 0 433 070 A2 | 6/1991 |
| JP | 11-29585 | 2/1999 |
| JP | 11-92177 | 4/1999 |

OTHER PUBLICATIONS

Patent Abstracts of Japan, vol. 1999, No. 09; Abstract of JP 11 092177.
Database WPI, Derwent Publications; AN 1999-175658, Week 199915, XP002199961; Abstract of JP 11 029585 1999.

* cited by examiner

*Primary Examiner*—Cephia D. Toomer
(74) *Attorney, Agent, or Firm*—Arent Fox LLP

(57) ABSTRACT

Use in the treatment of glass substrata of mono- and bifunctional (per)fluoropolyether compounds having the following structures:

$$R_f\text{—CFY-L-W} \quad \text{(I)}$$

$$W\text{-L-YFC—O—}R_f\text{—CFY-L-W} \quad \text{(II)}$$

wherein:
L is a linking organic group —CO—NR'—$(CH_2)_q$—, with R'=H or $C_1$-$C_4$ alkyl; q=1-8; Y=F, $CF_3$;
W is a —$Si(R_1)_\alpha(OR_2)_{3-\alpha}$ group with $\alpha$=0, 1, 2;
$R_1$ and $R_2$ equal to or different from each other are $C_1$-$C_6$ alkyl groups, optionally containing one or more ether O atoms, $C_6$-$C_{10}$ aryl groups, $C_7$-$C_{12}$ alkyl-aryl or aryl-alkyl groups;
Rf has a number average molecular weight in the range 350-5,000, and comprises repeating units of the type:

$$(CFXO),(CF_2CF_2O),(CF(CF_3)CF_2O),(CF_2CF(CF_3)O),$$

wherein X=F, $CF_3$.

7 Claims, No Drawings

TREATMENT OF GLASS SUBSTRATA WITH (PER) FLUOROPOLYETHER COMPOUNDS

The present invention relates to the use of specific perfluoropolyether compounds to confer to glass substrata an improved easy washing or improved washing durability, i.e. multiple washing cycles resistance. With washing cycles resistance it is meant the capability of the perfluoropolyether compounds to remain on the glass surface, nothwithstanding the high number of performed washings.

The use of glass articles for cooking some foods, for example milk-, sugar-based foods, etc., is known. Said glass articles, for example ovenproof pyrex dishes, are often washable with difficulty after the food cooking. The problem is still more remarked in the case of burnt foods adhering to the glass subtratum.

Generally for the the cleaning of said glass surfaces hot water and/or detergents are used. The drawback of these cleaning systems is that they are not very effective, they require much time, and above all they require, for the complete removal of the food residues, also the use of steel sponges which exert an abrasive mechanical action. The drawback of said abrasive action is to damage the glass surface since it causes scratches and also an optical effect of glass opacification.

In U.S. Pat. No. 5,286,815 the use of hydrogenated polysiloxanes to obtain antiadherent coatings on various substrata, among which paper, glass, etc., is described. No experimental proof is given related to coatings with these compounds on glass substrata. Therefore, there are no indications as regards the easy washing and the washing cycles resistance on glass substrata. Tests carried out by the Applicant, using glass pyrex dishes available on the market treated with hydrogenated polysiloxanes, show unsatisfactory results in terms of easy washing of the glass surface. In fact, to remove the food residues, it is necessary to use abrasive sponges, wherefore there are the above drawbacks (see the comparative Examples).

It is also known the use of perfluorocarbon silanes in various applications for the glass treatment. Said compounds can be polycondensed with other hydrogenated silanes to give polysiloxanes and they are used in formulations with solvent. For example, in U.S. Pat. No. 5,644,014 a fluorosilane is polycondensed with hydrogenated silanes to obtain a coating composition having transparence, antiadherence properties to substrata as glass, metals and plastic. No experimental result is given as regards the properties to make the glass surfaces easily washable without using abrasive systems or detergents.

U.S. Pat. No. 5,274,159 describes coating compositions which by hydrolysis and condensation of the components, give to the substratum hydro- and oil-repellence properties. The described compositions comprise fluorinated perfluorocarbon silanes and can be applied to various substrata, among which textile fibers, glass, ceramic, metals. Tests carried out by the Applicant show that by using a formulation comprising the compound $C_8F_{17}(CF_2)_dNSO_2N(C_2H_5)C_3H_6(OCH_3)_3$ described in this patent, there is a poor resistance to washing cycles, wherefore the compound applied to the glass substratum shows performances which decay after 5 washing cycles. Subsequent uses of the same substratum show that to obtain a complete glass cleaning also abrasive sponges must be used with the above drawbacks.

In U.S. Pat. No. 6,033,738, a method is described to give to glass, ceramic articles etc., high hydro-repellence and high resistance to abrasion and to atmospheric agents properties. Said method implies the treatment of the articles with a mixture formed by a chlorosilane and by a fluorosilane in Si(Cl):Si(F) concentration in the range 100:0.05-100:50. No experimental result is given as regards the properties to make the glass surfaces easily washable without using abrasive systems or detergents.

The need was therefore felt to give glass substrata, in particular glass, an improved easy washing and/or improved washing durability, i.e. multiple washing cycles resistance.

The Applicant has surprisingly and unexpectedly found that the improvement of the above mentioned properties can be achieved by using particular perfluoropolyethers as defined hereinafter.

An object of the present invention is therefore the use in the treatment of glass substrata of mono- and bifunctional (per)fluoropolyethers having the following structures:

  (I)

  (II)

wherein:

L is a linking organic group $-CO-NR'-(CH_2)_q-$, with $R'=H$ or $C_1$-$C_4$ alkyl; q is an integer comprised between 1 and 8, preferably 1-3;

$Y=F, CF_3$;

W is a $-Si(R_1)_\alpha(OR_2)_{3-\alpha}$ group with $\alpha=0, 1, 2$, preferably 0, 1;

$R_1$ and $R_2$ equal to or different from each other are $C_1$-$C_6$ alkyl groups, optionally containing one or more ether O atoms, $C_6$-$C_{10}$ aryl groups, $C_7$-$C_{12}$ alkyl-aryl or aryl-alkyl groups;

Rf has a number average molecular weight in the range 350-5,000, preferably 500-3,000 and comprises repeating units having at least one of the following structures, statistically placed along the chain:

wherein $X=F, CF_3$;

In particular Rf can have one of the following structures:

  1)

with a'/b' in the range 0.5-2, extremes included, a' and b' being integers such to give the above molecular weight;

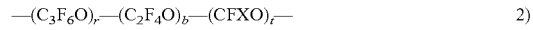  2)

with r/b=0.5-2.0; (r+b)/t is in the range 10-30, b, r and t being integers such as to give the above molecular weight, X has the above meaning;

  3)

t' can be 0;

when t' is different from 0 then r'/t'=10-30, r' and t' being integers such as to give the above molecular weight; X has the above meaning.

In the above mentioned formulas:

$-(C_3F_6O)-$ can represent units of formula

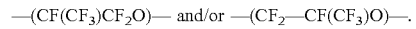

In structure (I) wherein the compound is monofunctional, the end group of $R_f$ is of the T-O— type, wherein T is a (per)fluoroalkyl group selected from: $-CF_3$, $-C_2F_5$, $-C_3F_7$, $-CF_2Cl$, $-C_2F_4Cl$, $-C_3F_6Cl$; optionally one or two F atoms, preferably one, can be replaced by H.

Mixtures of the above mentioned compounds (I) and (II) are preferably used.

As preferred perfluoropolyether compounds of formula (II) those having $R_f$ of structure (1) are used; as preferred perfluoropolyether compounds of formula (I) those having $R_f$ of structure (3) are used.

It has been found that by using the compounds of the invention of formula (I) an easy washing of the glass surface is obtained superior to that given by the hydrogenated polysiloxanes used in the prior art for the glass treatment. The compounds of formula (I) have a good resistance to washing cycles up to 8-9 cycles.

It has been found that by using the compounds of the invention of formula (II) an easy washing of the glass surface is obtained superior to that given by the hydrogenated polysiloxanes of the prior art, but slightly lower than that of the compounds of formula (I). Besides, the compounds of formula (II) give the further advantage not to be removed even after a high number of washing cycles (over 10), wherefore the treatment effect results prolonged in the time.

The Applicant has found that by using in admixture the compounds of formula (I) and (II), a better easy washing is obtained combined with a greater resistance to washing cycles. In this case an admixture is used having a ratio by weight between the compound of structure (I) and that of structure (II) in the range 10:1-1:1, preferably 5:1-2:1.

The bifunctional fluoropolyethers of formula (II) are obtainable by well known processes in the prior art, see for example the following patents herein incorporated by reference: U.S. Pat. No. 3,847,978 and EP 374,740 for preparing compounds with acid end groups of —COF type. The silane end group of formula (II) can be obtained by transformation of the —COF group into the —COOR ester group wherein R=alkyl, preferably $C_1$-$C_{12}$, and subsequent ester reaction according to the processes for example mentioned in U.S. Pat. No. 3,810,874. In particular, see U.S. Pat. No. 5,714,637, U.S. Pat. No. 4,094,911, U.S. Pat. No. 4,818,619. To increase the content of the bifunctional acid compounds the keto-acid described in U.S. Pat. No. 3,847,978 can be treated with bases obtaining a mixture of carboxylic acids and polyethers having —$CF_2H$ end groups. If the pure bifunctional derivative of formula (II) is desired, further purification steps, for example distillation or chromatography can be carried out.

The monofunctional compounds of formula (I) are obtainable according to the methods indicated in EP 374,740, and subsequent transformation of the —COF groups into silane end groups according to the same methods mentioned for the bifunctional compounds of formula (II).

Examples of glass substrata for which the treatment of the invention has given positive results, are ovenproof pyrex dishes and pots and kitchen containers in general.

The (per)fluoropolyether compounds of the invention can be applied by spin-coating, dipping, brushing, spraying, padding, preferably by spin-coating, dipping.

The compounds of the invention are applied by using formulations with solvent, solvent-water admixtures or prevailingly aqueous formulations. The solvents can be polar or apolar. Among apolar solvents, fluorinated solvents or hydrocarbon solvents can for example be mentioned. Examples of fluorinated solvents are perfluoropolyether, hydroperfluoropolyether and perfluorocarbon solvents. Hydrocarbon solvents are selected among the linear or branched aliphatic ones.

The polar solvents are selected from the following classes: aliphatic alcohols having from 1 to 6 carbon atoms; aliphatic glycols having from 2 to 8 carbon atoms, optionally having an esterified hydroxyl; ketones or esters having from 3 to 10 carbon atoms, etc.

In the above formulations the concentration of the (per)fluoropolyethers of formula (I) and (II) is generally in the range 0.1-10% by weight, preferably 0.5-2.5% by weight. The amount of (per)fluoropolyether compound applied to the glass substratum surface is such as to obtain thin coatings having a thickness generally in the range 0.01-1 μm, preferably 0.05-0.3 μm.

In the used formulation also an hydrolysis catalyst of the silane group can be present, such as an acid or a base. As acids, phosphates or perfluoropolyether carboxylates or other acids such as for example acetic acid, hydrochloric acid and nitric acid can be used.

As basic catalysts for the crosslinking of the compounds of the invention, ammonia and aliphatic or aromatic amines can be used. In the formulation an amount of water can be introduced to favour the hydrolysis reactions and the condensation of the perfluoropolyether silanes.

After the application of the formulation containing the perfluoropolyether silanes of the invention, a thermal treatment of the glass surface can be carried out at a temperature in the range 60-250° C., preferably 80-200° C. for a time ranging from 1 to 60 minutes, preferably 10-30 minutes. Such thermal treatment allows a quick evaporation of the solvent and favours the further polycondensation of the perfluoropolyether silanes. When one wants to avoid the thermal treatment it is necessary the presence of the above mentioned acid or basic catalysts in the used formulation. Besides in this case it is necessary to wait for at least 24 hours to obtain the crosslinking of the compounds of the invention.

The compounds of the invention can furthermore be applied also to window glasses, in particular to the side exposed to atmospheric agents.

Another possible application of the compounds of the invention is that regarding the treatment of screens, for example of computers, television sets, etc. In this case a lower dirt pick up of the screen, in particular a lower anti-print effect has been noticed. This is particularly desired, since it is preferred to carry out the lowest number of washings as possible not to damage the electric parts of the system with the used solvent.

The present invention will be better illustrated by the following Examples, which have a merely indicative but not limitative purpose of the scope of the invention itself.

EXAMPLES

Characterization

Food Removal Test

About 3 ml of milk are deposited on a slide having 50×50 mm sizes, previously treated with a formulation containing the compounds of the invention. The glass is heated on a heating stove at a temperature of 150° C. for a time equal to 20 minutes; the milk after prolonged boiling takes a brown coloration and firmly adheres to the glass surface. Subsequently it is let cool to room temperature and one proceeds to the food removal. The evaluation of the easy removal of the food is made on the basis of the mechanical means used for the food removal. In Table 1 the means used to have a complete removal of the food from the glass substratum and the respective reference letter are reported.

The desired results are those identified with the letter A and B, which imply the food removal only using hot water or detergent without the use of abrasive sponges.

TABLE 1

| Means used for the food removal | Identification |
|---|---|
| Hot water | A |
| Water + detergent | B |
| Water + detergent + sponge | C |
| Water + detergent + abrasive sponge | D |
| Water + detergent + steel sponge | E |

Measurement of the Dynamic Contact Angle (DCA)

To evaluate the adherence and the permanence degree of the formulation applied to the slide before and after the food deposition, a measurement of the dynamic contact angle by the SIGMA70 (KSV) instrument is carried out. The advancing contact angle ($\Theta_a$) towards water is measured at the temperature of 20° C.

It is known that fluorinated surfaces show a low surface energy and consequently they are scarcely wetted by water (dynamic contact angle higher than 100° C.). In the case of untreated glass substrata there is a quite complete wettability from water (contact angle lower than 30° C.).

Example 1

Untreated Glass

A slide having 50×50 mm sizes is subjected to the food removal test using milk according to the described procedure.

It happens that for the milk removal subjected to cooking it is necessary, as reported in Table 2, the use of the steel sponge which implies the formation of scratches on the glass surface.

Example 2

A slide having 50×50 mm sizes is treated by dipping at a dipping rate equal to 0.526 mm/sec with 25 ml of a formulation formed by:

1% by weight of a mixture of perfluoropolyether silanes of structure (A) and (B) in a weight ratio 3/1:

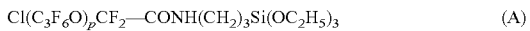

$$Cl(C_3F_6O)_pCF_2\text{—}CONH(CH_2)_3Si(OC_2H_5)_3 \quad (A)$$

wherein p=2-5

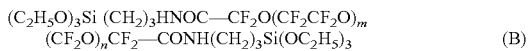

$$(C_2H_5O)_3Si\,(CH_2)_3HNOC\text{—}CF_2O(CF_2CF_2O)_m(CF_2O)_nCF_2\text{—}CONH(CH_2)_3Si(OC_2H_5)_3 \quad (B)$$

wherein n=2-4, m=2-6

94% by weight of isopropoyl alcohol;
4% by weight of water;
1% by weight of acetic acid as hydrolysis catalyst.

To speed up the hydrolysis, the solution is used for the treatment of the specimen after 30 minutes from its preparation.

After the treatment, the slide is subjected to thermal curing in stove at the temperature of 170° C. for 15 minutes.

The treated slide is subjected to the food removal test by using milk according to the described procedure.

It happens that for the milk removal subjected to cooking a simple washing with hot water is sufficient, as reported in Table 2. The same results are obtained even repeating several times the milk removal test and the subsequent washing.

Washing Cycles Resistance Test

A measurement of the dynamic contact angle is carried out on the slide after the treatment with the formulation of the invention and after the food removal. The results are reported in Table 3. High values of dynamic contact angle (higher than 100° C.) are noticed; they show a significant permanence of the fluorinated compound even after the food removal test carried out several times (deposition cycles and subsequent washings).

Example 3

A slide having 50×50 mm sizes is treated by dipping at a dipping rate equal to 0.526 mm/sec with a formulation formed by:

1% by weight of a perfluoropolyether silane having the structure:

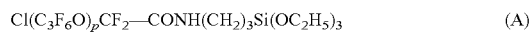

$$Cl(C_3F_6O)_pCF_2\text{—}CONH(CH_2)_3Si(OC_2H_5)_3 \quad (A)$$

wherein p=2-5

94% by weight of isopropyl alcohol;
4% by weight of water;
1% by weight of acetic acid as hydrolysis catalyst.

To speed up the hydrolysis, the solution is used for the treatment of the specimen after 30 minutes from its preparation.

After the treatment, the slide is subjected to thermal curing in a stove at the temperature of 170° C. for 15 minutes.

The treated slide is subjected to the food removal test by using milk according to the described procedure.

It happens that for the milk removal subjected to cooking, water+detergent are used, as reported in Table 2.

Washing Cycles Resistance Test

A measurement of the dynamic contact angle is carried out as described in Example 2. The results are reported in Table 3. High values of dynamic contact angle (higher than 100° C.) are noticed for a number of washing cycles equal to 5.

Example 4

A slide having 50×50 mm sizes is treated by dipping at a dipping rate equal to 0.526 mm/sec with a formulation formed by:

1% by weight of a perfluoropolyether silane having the structure:

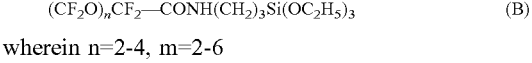

$$(C_2H_5O)_3Si(CH_2)_3HNOC\text{—}CF_2O(CF_2CF_2O)_m(CF_2O)_nCF_2\text{—}CONH(CH_2)_3Si(OC_2H_5)_3 \quad (B)$$

wherein n=2-4, m=2-6

94% by weight of isopropyl alcohol;
4% by weight of water;
1% by weight of acetic acid as hydrolysis catalyst.

To speed up the hydrolysis, the solution is used for the treatment of the specimen after 30 minutes from its preparation.

After the treatment, the slide is subjected to thermal curing in a stove at the temperature of 170° C. for 15 minutes.

The treated slide is subjected to the food removal test by using milk according to the described procedure.

It happens that for the milk removal subjected to cooking, water+detergent are used, as reported in Table 2.

Washing Cycles Resistance Test

A measurement of the dynamic contact angle is carried out as described in Example 2. The results are reported in Table 3. High values of dynamic contact angle (higher than 100° C.) are noticed; they show a significant permanence of the fluorinated compound even after the food removal test carried out several times (deposition cycles and subsequent washings).

Example 5

A slide having 50×50 mm sizes is treated by dipping at a dipping rate equal to 0.526 mm/sec with 25 ml of a formulation formed by:

0.5% by weight of a mixture of perfluoropolyether silanes having structure (A) and (B) in a weight ratio 3/1:

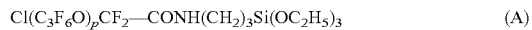

$Cl(C_3F_6O)_pCF_2—CONH(CH_2)_3Si(OC_2H_5)_3$      (A)

wherein p=2-5

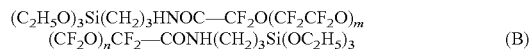

$(C_2H_5O)_3Si(CH_2)_3HNOC—CF_2O(CF_2CF_2O)_m$
$(CF_2O)_nCF_2—CONH(CH_2)_3Si(OC_2H_5)_3$      (B)

wherein n=2-4, m=2-6

94.5% by weight of isopropyl alcohol;
4% by weight of water;
1% by weight of acetic acid as hydrolysis catalyst.

To speed up the hydrolysis, the solution is used for the treatment of the specimen after 30 minutes from its preparation.

After the treatment, the slide is subjected to thermal curing in a stove at the temperature of 170° C. for 15 minutes.

The treated slide is subjected to the food removal test by using milk according to the described procedure.

It happens that for the milk removal subjected to cooking, a simple washing with hot water, as reported in Table 2, is sufficient. The same results are obtained even repeating several times the milk removal test and the subsequent washing.

Washing Cycles Resistance Test

A measurement of the dynamic contact angle is carried out on the slide after the treatment with the formulation of the invention and after the food removal. The results are reported in Table 3. High values of dynamic contact angle (higher than 100° C.) are noticed; they show a significant permanence of the fluorinated compound even after the food removal test carried out several times (deposition cycles and subsequent washings).

Example 6

A slide having 50×50 mm sizes is treated by dipping at a dipping rate equal to 0.526 mm/sec with 25 ml of a formulation formed by:

2% by weight of a mixture of perfluoropolyether silanes having structure (A) and (B) in a weight ratio 3/1:

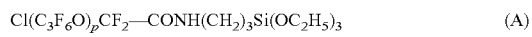

$Cl(C_3F_6O)_pCF_2—CONH(CH_2)_3Si(OC_2H_5)_3$      (A)

wherein p=2-5

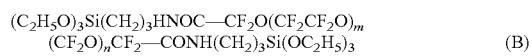

$(C_2H_5O)_3Si(CH_2)_3HNOC—CF_2O(CF_2CF_2O)_m$
$(CF_2O)_nCF_2—CONH(CH_2)_3Si(OC_2H_5)_3$      (B)

wherein n=2-4, m=2-6

93% by weight of isopropyl alcohol;
4% by weight of water;
1% by weight of acetic acid as hydrolysis catalyst.

To speed up the hydrolysis, the solution is used for the treatment of the specimen after 30 minutes from its preparation.

After the treatment, the slide is subjected to thermal curing in a stove at the temperature of 170° C. for 15 minutes.

The treated slide is subjected to the food removal test by using milk according to the described procedure.

It happens that for the milk removal subjected to cooking, a simple washing with hot water, as reported in Table 2, is sufficient. The same results are obtained even repeating several times the milk removal test and the subsequent washing.

Washing Cycles Resistance Test

A measurement of the dynamic contact angle is carried out on the slide after the treatment with the formulation of the invention and following the food removal. The results are reported in Table 3. High values of dynamic contact angle (higher than 100° C.) are noticed; they show a significant permanence of the fluorinated compound even after the food removal test carried out several times (deposition cycles and subsequent washings).

Example 7 (Comparative)

A slide having 50×50 mm sizes is treated by dipping at a dipping rate equal to 0.526 mm/sec with 25 ml of a formulation formed by:

1% by weight of a fluorocarbon silane of formula:

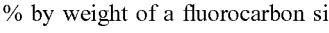

$CF_3(CF_2)_dSO_2N(C_2H_5)C_3H_6Si(OCH_3)_3$ wherein d=5-7

94% by weight of ethyl alcohol;
4% by weight of water;
1% by weight of acetic acid as hydrolysis catalyst.

To speed up the hydrolysis, the solution is used for the treatment of the specimen after 30 minutes from its preparation.

After the treatment, the slide is subjected to thermal curing in a stove at the temperature of 170° C. for 15 minutes.

The treated slide is subjected to the food removal test by using milk according to the described procedure.

It happens that for the milk removal subjected to cooking, a simple washing with hot water+detergent, as reported in Table 2, is sufficient.

Washing Cycles Resistance Test

A measurement of the dynamic contact angle is carried out on the slide after the treatment with the formulation of the invention and after the food removal. The results are reported in Table 3. A poor washing cycles resistance is noticed when the number of cycles is higher than 5.

Example 8 (Comparative)

A 0.8 l pyrex dish commercially available by the trademark ARCUISINE® has been used, formed by glass treated with hydrogenated polysiloxanes.

The pyrex dish is filled with 100 ml of milk and brought to boiling until obtaining the milk burning. The pyrex dish so dirtied by the burnt milk is subjected to the food removal test until the complete cleaning of the pyrex dish itself. The results are reported in Table 2. The data show that for the complete removal of the milk it is necessary to use hot water+detergent and abrasive sponge.

Example 9 (Comparative)

Example 8 has been repeated but using an untreated glass 0.8 l pyrex dish and subjecting it to the treatment with hydrogenated polysiloxane according to Example 11 of U.S. Pat. No. 5,286,815.

The polysiloxane concentration in the solution was equal to 2% by weight. The obtained results are substantially similar to those of Example 8.

TABLE 2

|  | Food removal evaluation (1) | Food removal evaluation (5) | Food removal evaluation (10) |
|---|---|---|---|
| Example 1 | E | E | E |
| Example 2 | A | A | A |
| Example 3 | B | B | C |
| Example 4 | B | B | B |
| Example 5 | A | A | A |
| Example 6 | A | A | A |
| Example 7 (comp) | B | C | D |
| Example 8 (comp) | D | E | E |

(1) food removal test carried out once
(5) food removal test carried out 5 times
(10) food removal test carried out 10 times

TABLE 3

| Example | untreated glass $\Theta_a$ | treated glass $\Theta_a$ | after food test (5) $\Theta_a$ | after food test (10) $\Theta_a$ |
|---|---|---|---|---|
| 1 | 25° | — | — | — |
| 2 | 25° | 110° | 108° | 105° |
| 3 | 25° | 112° | 108° | 92° |
| 4 | 25° | 106° | 105° | 104° |
| 5 | 25° | 106° | 104° | 102° |
| 6 | 25° | 112° | 108° | 106° |
| 7 (Comp) | 25° | 111° | 102° | 70° |

(5) food removal test carried out 5 times
(10) food removal test carried out 10 times

The invention claimed is:

1. A process of easy washings of glass substrates for multiple washing cycles, said process comprising:
   (A) coating a glass surface with a composition consisting essentially of a mixture of formulas (I) and (II):

$$R_f\text{—CFY-L-W} \tag{I}$$

$$\text{W-L-YFC—O—}R_f\text{—CFY-L-W} \tag{II}$$

wherein:
   L is a linking organic group —CO—NR'—(CH$_2$)$_q$—, with R'=H or C$_1$-C$_4$ alkyl; q is an integer comprised between 1 and 8;
   Y=F, CF$_3$;
   W is a —Si(R$_1$)$_\alpha$(OR$_2$)$_{3-\alpha}$ group with $\alpha$=0, 1, 2, R$_1$ and R$_2$ equal to or different from each other are C$_1$-C$_6$ alkyl groups, optionally containing one or more ether O atoms, C$_6$-C$_{10}$ aryl groups, C$_7$-C$_{12}$ alkyl-aryl or aryl-alkyl groups;
   R$_f$ has a number average molecular weight in the range 350-5,000, and comprises repeating units having at least one of the following structures, randomly distributed in the chain:

(CFXO),(CF$_2$CF$_2$O),(CF(CF$_3$)CF$_2$O),(CF$_2$CF(CF$_3$)O), wherein X=F, CF$_3$;
   wherein the structure (I) the end group of R$_f$ is of the T—O— type, wherein T is a (per)fluoroalkyl group selected from: —CF$_3$, —C$_2$F$_5$, —C$_3$F$_7$, —CF$_2$Cl, —C$_2$F$_4$Cl, —C$_3$F$_6$Cl; optionally one or two F atoms can be replaced by H; and
   wherein the admixture has a ratio by weight between the compound of structure (I) and that of structure (II) in the range 10:1-1:1; and
   (B) washing the coated glass surface with hot water or water and detergent.

2. The process of claim 1, wherein R$_f$ is selected from the group consisting of one of the following structures:

$$\text{—(CF}_2\text{O)}_{a'}\text{—(CF}_2\text{CF}_2\text{O)}_{b'}\text{—} \tag{1}$$

with a'/b'=0.5-2, a' and b' being integers to give the above molecular weight;

$$\text{—(C}_3\text{F}_6\text{O)}_{r}\text{—(C}_2\text{F}_4\text{O)}_{b}\text{—(CFXO)}_{t}\text{—} \tag{2}$$

with r/b=0.5-2.0; (r+b)/t is in the range 10-30, b, r and t being integers to give the above molecular weight, X has the above meaning;

$$\text{—(C}_3\text{F}_6\text{O)}_{r'}\text{—(CFXO)}_{t'}\text{—} \tag{3}$$

t' can be 0;
   when t' is different from 0 then r'/t'=10-30,
   r' and t' being integers to give the above molecular weight; X has the above meaning.

3. The process of claim 1, wherein the compounds of formula (II) have R$_f$ of structure (1)

$$\text{—(CF}_2\text{O)}_{a'}\text{—(CF}_2\text{CF}_2\text{O)}_{b'} \tag{1}$$

with a'/b'=0.5-2, a' and b' being integers to give the above molecular weight.

4. The process of claim 1, wherein the compounds of formula (I) have R$_f$ of structure (3)

$$\text{—(C}_3\text{F}_6\text{O)}_{r'}\text{—(CFXO)}_{t'} \tag{3}$$

t' can be 0
   when t' is different from 0 then r'/t'=10-30,
   r' and t' being integers to give the above molecular weight; X has the above meaning.

5. The process of claim 1, wherein the compounds of formula (I) and (II) are applied by spin-coating, dipping, brushing, spraying or padding.

6. The process of claim 1, wherein the compounds of formula (I) and (II) are applied using formulations with solvent, solvent-water admixtures or prevailingly aqueous formulations.

7. The process of claim 6, wherein in the formulations the concentration of the compounds (I) and (II) is in the range 0.1-10% by weight.

* * * * *